Sept. 24, 1929.   I. H. HALFERTY   1,729,040
SPECTACLE FRAME
Filed April 16, 1924
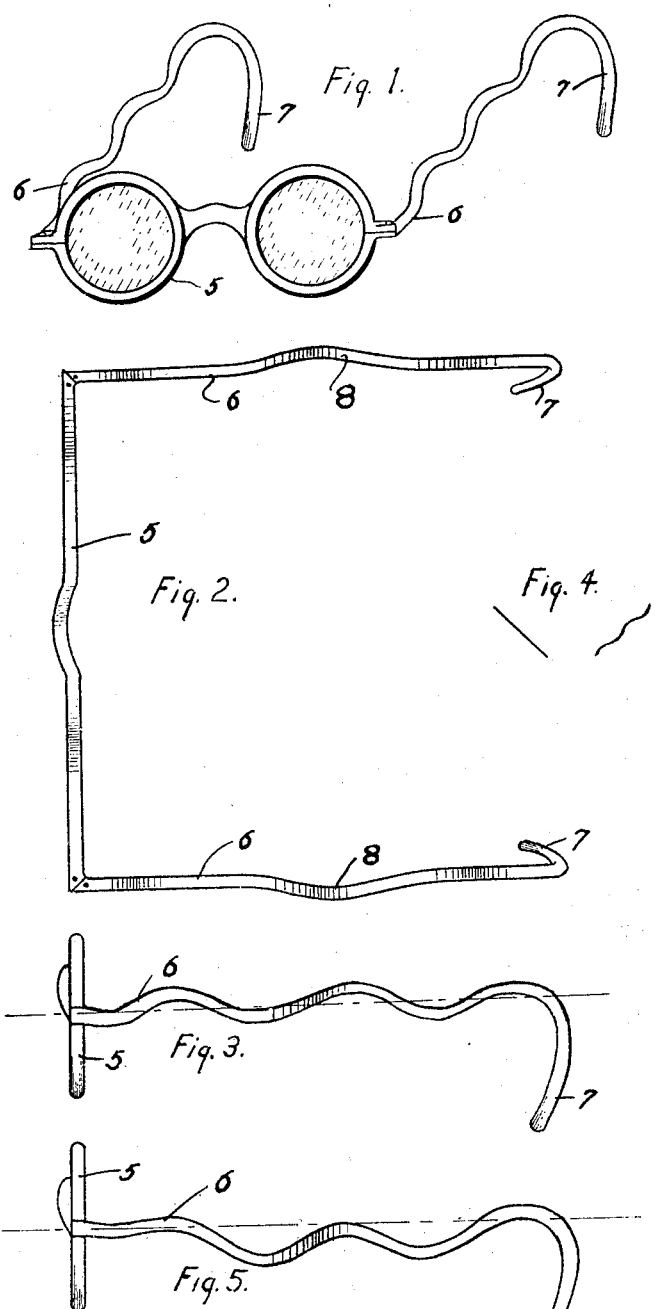

Patented Sept. 24, 1929

1,729,040

UNITED STATES PATENT OFFICE

IRWIN H. HALFERTY, OF PITTSBURGH, PENNSYLVANIA

SPECTACLE FRAME

Application filed April 16, 1924. Serial No. 706,872.

This invention is for an improvement in spectacles, and relates particularly to an improved temple construction for spectacle frames.

Due to their greater comfort and more accurate adjustment of themselves with respect to the eyes, spectacles are being more preferred, generally, than nose glasses, although in many cases they are far less suited to the face of the wearer, from the standpoint of appearance, than nose glasses.

This has led to a study of spectacle frames by those interested in the art, to determine why, in many cases, spectacles detract from the appearance of the wearer. For instance, it is generally accepted that spectacles tend to make the wearer look older than he does with nose-glasses or without any glasses. It has also been noticed that spectacles tend to make the face of the wearer appear shorter and broader, and more round, and frequently give what is termed a "boxed-in" appearance.

In connection with such investigations as have been made, certain facts have been recognized that enter into the effect produced by spectacles. Omitting such matter of impression as may be given by the color of the wearer's hair, and the color of the spectacle frames, other illusions have been considered. For instance, it is accepted that a straight line drawn through an object tends to make the object look longer and larger in the direction of the line. Consequently, spectacles with straight temples, together with the horizontal lines produced by the bridge of the glasses and the eyebrows of the wearer, make the face of the wearer look shorter and wider, that is, make it look more round.

It is further recognized that lines which are parallel or nearly parallel increase the apparent intensity of the lines. Persons, then, having wrinkles or creases extending along the face back from the eyes, and in a more or less horizontal plane, and this is where the first indications of age generally appear, are made to look older by the addition of a horizontal temple, more or less parallel to the creases, the positive line of the temple, and also its shadow, accentuating the other lines of the face. Prominent cheek bones are also accentuated more or less by the horizontal temples of spectacle frames.

As between two lines, one straight and the other crooked, extending between points the same distance apart, the straight line will generally appear the longer.

I have found that, by imparting to the temples a graceful sinuous curve, the effect produced by spectacles on the face of the wearer will be very strikingly different, and that in practically every case, the spectacles with the sinuously curved temples will be very much better appearing than where straight temples are provided.

The invention may be described in connection with the accompanying drawings, in which:

Fig. 1 is a perspective view of a pair of spectacles;

Fig. 2 is a top view thereof;

Fig. 3 is a side view thereof;

Fig. 4 is a diagrammatic view illustrating an optical principle utilized by my invention; and Fig. 5 is a side view of a slightly modified construction.

In the drawings, 5 designates a pair of spectacles with lenses and frames, having temples 6 extending rearwardly therefrom, and which, if desired, may have ear-hooks 7 at their ends. The horizontal portion of each temple is sinuously curved in a vertical plane, there being several curves of graceful outline, care being taken not to make them so shaped as to be angular or serrated in appearance. The sinuations, preferably, extend from a point immediately behind the lenses to the beginning of the ear hooks.

If desired, one or more lateral curves may be formed in the vertically sinuated part, as indicated at 8, although this is in no way necessary, and might be desirable in only a few cases. Such lateral curvature serves to break any straight line effect that may be apparent when the glasses are viewed along the temple from the front and above the temple.

The effect of the sinuated part is to create illusions to produce effects that are different from those produced by straight temples, generally lending to the face a softness and an appearance that is far superior to that produced by straight temples, and causing the lines of the face to appear less pronounced and unnoticeable.

Fig. 4 is intended to illustrate, and to most persons shows, that a sinuous line extending between two points appears shorter than a straight line between two points the same distance apart. Utilizing this principle, as my glasses do, they serve to make the face look less broad than do the straight temples of ordinary glasses. The curved temples do not accentuate the creases and lines of the face, or a prominent cheek-bone, in the way that straight temples do. Furthermore, the curved temples are more graceful, so that, besides serving to create or destroy illusions, they are in themselves pleasingly ornamental.

In Fig. 5, the temple is illustrated as being curved throughout its length in one long continuous curve, in addition to being sinuously curved, so as to add to the illusion created.

I claim as my invention:

1. In a spectacle, the combination with a frame comprising a pair of eye pieces and a middle connecting portion, of a pair of temples extending backwardly at each end of the frame, each of said temples being continuously and alternately curved in sinuous formation both vertically and laterally.

2. In a spectacle, the combination with a frame comprising a pair of eye pieces and a middle connecting portion, of a pair of temples extending backwardly at each end of the frame, each of said temples being continuously and alternately curved in sinuous formation both vertically and laterally, and having a terminal downwardly extending ear hook.

In testimony whereof I affix my signature.

IRWIN H. HALFERTY.